Aug. 22, 1933.　　　R. O. COUCH ET AL　　　1,923,190
ANTISKID DEVICE FOR AUTOMOBILES
Filed July 10, 1931
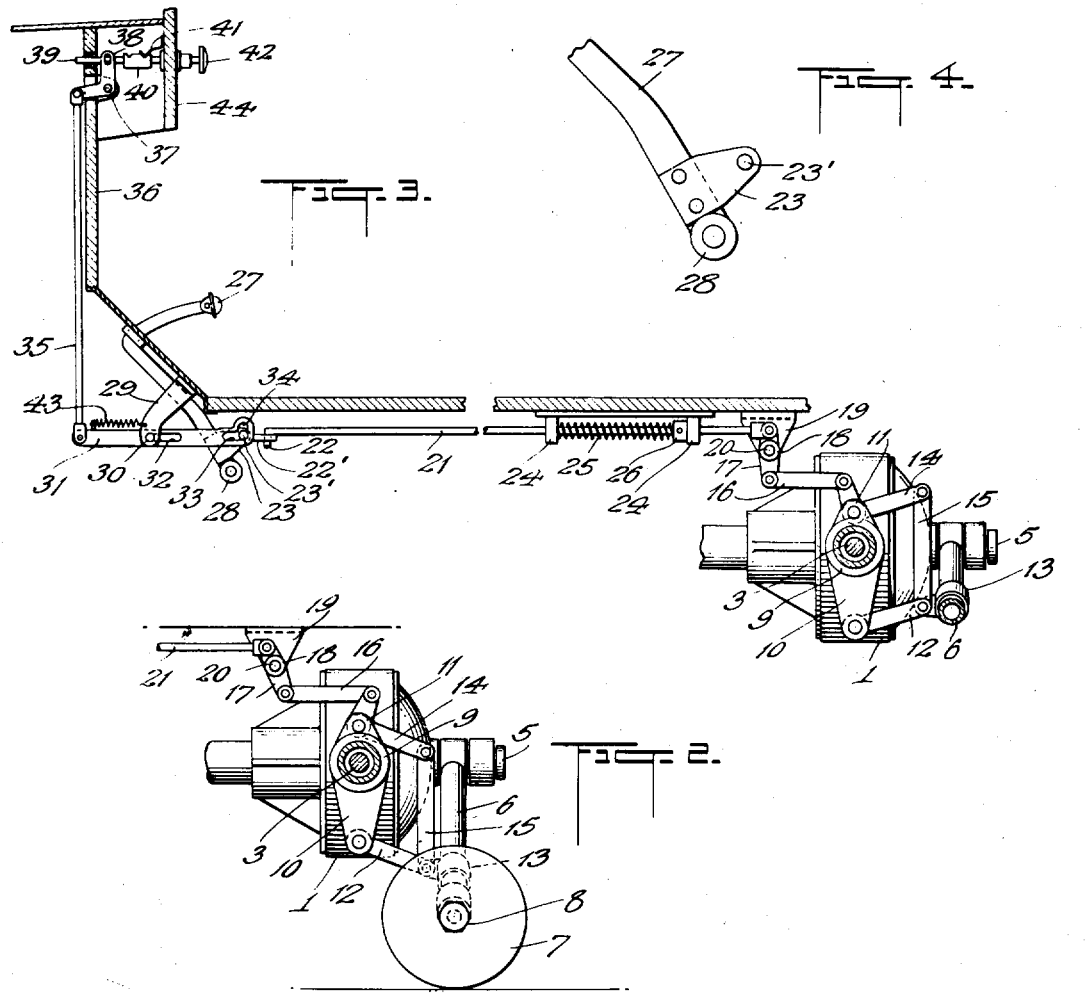
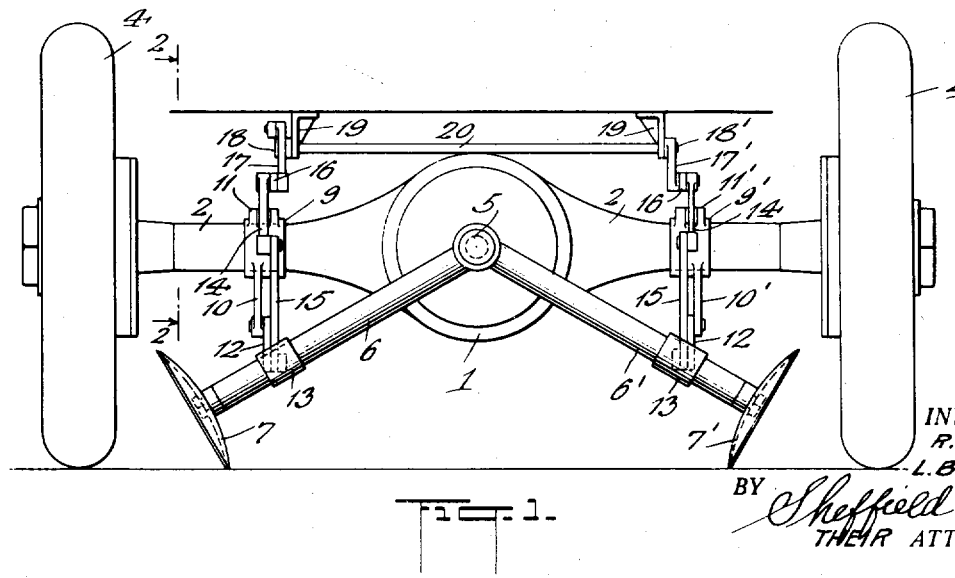
INVENTORS.
R. O. COUCH.
L. B. ESCHBACH.
BY Sheffield & Betts
THEIR ATTORNEYS.

Patented Aug. 22, 1933

1,923,190

UNITED STATES PATENT OFFICE 1,923,190

ANTISKID DEVICE FOR AUTOMOBILES

Royden O. Couch, Grant, and Leo B. Eschbach, Melbourne, Fla.

Application July 10, 1931. Serial No. 549,906

4 Claims. (Cl. 188—5)

This invention relates to devices for preventing side slipping of automobiles when traveling on slippery roads and around curves at considerable speed. The device does not relate to the construction of tires or wheels of an automobile, but is independent thereof, and is carried by the chassis or under-structure of an automobile, and may readily be made operative upon the surface of a road at the will of the driver of an automobile without injury to the road surface, at any time.

The object of the invention is to provide such an arrangement of parts that the anti-skid effect of such parts will be of maximum efficiency, will be under complete control of the driver of a car, and will cause no injury to the road surface when in operation or at any other time. A further object of the invention is to provide an anti-skid device which will be operative only at times when an automobile is likely to skid because of the sudden application of the brakes to stop the rotation of the wheels. Owing to the angular mounting of the anti-skid devices or disks they will act only when a side slipping of the car actually occurs.

Provision is therefore made to cause the anti-skid device to become operative when the brake is applied if the driver of the car so desires.

A further object of the invention is to provide a device which may be applied not only to the rear wheels but to the forward wheels of a car, although the particular embodiment of the invention herein is illustrated and described only in connection with the rear wheels of an automobile.

For a detailed description of one form of our invention which we at present deem preferable, reference may be had to the following specification and to the accompanying drawing forming a part thereof, in which Fig. 1 is an elevation of the rear end of an automobile showing the general arrangement of our anti-skid devices;

Fig. 2 is a side elevation of our improved antiskid device attached to the rear axle and showing said axle in section taken substantially upon the line 2—2 of Fig. 1;

Fig. 3 is a view similar to Fig. 2, but showing operating and activating mechanism connected with the parts adjacent the driver's seat; and Fig. 4 is a detail view of the means for connecting the brake pedal and lever with the anti-skid apparatus.

Referring to the drawing, the numeral 1 indicates the housing which usually encloses the differential gears whereby the longitudinal transmission shaft is connected with the transverse rear axle. As is usual in such cases, the housing extends laterally in the form of hollow tubes indicated at 2 and carries the driving axle 3, which is connected with the wheel 4 in the usual manner.

On the housing 1 there is pivoted, as at 5, a pair of transversely extending arms or supports 6 and 6', which may be made in any suitable form, and on the ends of which are carried rotatable circular disks 7 and 7', which may be rotatably connected with the ends of the arms 6 and 6' by any suitable means, such as the nut 8. These disks are preferably slightly cupped and are made in a manner similar to disks ordinarily employed in agricultural implements, such as harrows, and are provided with sharp or angular edges, so that they may readily engage the road surface or the surface of ice or other slippery material. On the tubular portions 2 of the housing for the rear axle are annular collars 9 and 9' which are fixed in position thereon in any suitable way, and are provided with upwardly and downwardly extending brackets or arms 10, 10' and 11, 11'. The arms 10 and 10' have pivoted thereto connecting rods or links 12, the outer ends of which are pivoted to lugs carried by collars 13 surrounding the supporting arms 6, 6' for the disks 7 and 7'.

The links 12 oscillate about the ends of arms 10 and 10' through comparatively small angles and the slight longitudinal movements of the collars 13 and the supporting arms 6 and 6' are provided for by the resiliency of the parts and by slight looseness of the bearings of said arms at the pivots 5, which does not need to be closely fitted to said bearings. Otherwise, a skilled mechanic may easily overcome any such a difficulty if it should arise.

The upper fixed arm 11 may be pivoted to a bell crank lever such as 14, one arm of which is pivoted to the connecting rod or link 15, which latter is also pivoted to the lug on the collar 13. It will now be seen that the rearwardly extending arm of the bell crank lever 14, the rearwardly extending link 12, and the connecting rod or link 15 serve to guide and cause the upward and downward motion of the supporting arms 6 and 6' around their pivot 5. The connecting rod 12, being pivoted to the fixed arm 10, serves to prevent the support 6 and 6' from moving rearwardly when the disks are in contact with the ground and the car is traveling forward, thus preventing undue strain on the pivot 5 for the supports 6 and 6'. The opposite arm of bell crank lever 14 has a pivoted connection with a connecting rod or link 16, the forward end of which is connected with a straight double arm lever 17 pivoted on brackets 19 carried by the chassis or other convenient part of the body of the car. The right hand lever 17' has no upwardly extending arm, but is connected with the rod 20, which forms the pivot 18' and also the pivot 18 so that when the lever 17 is operated the lever 17' will also be operated in the same way. The upper arm of the lever 17 is pivotally attached to a rod 21 which extends forward beneath the car and is provided on its forward end with a suitable connection 22 hereinafter referred to.

The rod 21 is also provided with guides 24, through which it passes, said rod 21 carrying a spring 25, one end of which rests against the fixed collar 26 on the rod 21. The pressure of the spring 25 against the collar 26 will obviously tend to move the rod 21 toward the left and by reason of its connection with the other parts above described, will tend to raise the supports 6 and 6' and the disks 7 and 7' to their retracted positions, which positions they assume when not in use. The force of the spring should be such as to hold the disks in their retracted positions and yet require only a slight opposing force to lower the disks to their operative positions on the road surface.

The numeral 27 indicates a foot pedal of the usual type connected with the braking system of a car, the same being pivoted as at 28, and provided with a bracket 23 in which is fixed a laterally projecting pin 23'. This foot pedal in the present instance is used to operate the anti-skid device, and such operation is made active by the use of a knob or other suitable device, preferably located on the instrument board, 28.

To this end a suitable bracket 29 is provided having at its lower end a pin 30 about which the lever 31 may oscillate angularly and also slide longitudinally, which sliding motion may be accomplished through the slot 32.

The rearward end of the lever or bar 31 is provided with a slot 33 having offset portion 34 providing a notch within which the laterally projecting pin 23' may rest. The rearward end of the lever 31 carries the connecting part 22 above referred to, in this case the rod 2 having an end 22 extending downward and retained in connection with the lever 31 by the eye 22'. The lever or bar 31 is pivotally connected with a rod 35 extending vertically at the rear of the dashboard 36, and its upper end is pivotally connected with the bell crank lever 37. The upper arm of the bell crank lever 37 is provided with a slot which engages a pin 38 carried on a rod 39 extending through a suitable bearing in the instrument board 44. The rod 39 is provided with a suitable device, such as a notched collar 40, and a resilient stop device 41 for holding the rod 39 in two positions, as indicated in Fig. 3. The rod 39 is provided with a suitable knob or handle 42 for reciprocating said rod.

It will now be apparent that when the knob 42 on the rod 39 is pushed in as indicated in Fig. 3, the slotted bar 31 will be substantially horizontal and the pin 23' will not engage the notch 34 of the slot 33, and therefore the depression of the pedal 27 to operate the brakes will have no effect upon the anti-skid device. The parts are then in their inoperative positions and the car may travel forward or backward without regard to the anti-skid device.

When it is desired to cause the anti-skid device to come into operation, as when the car is traveling over wet or slippery roads, the driver of the car may pull out the knob 42 which operates the bell crank lever 37 and raises the rod 35 to cause the pin 23 to enter the notch 34. The depression of the right hand end of the lever 31 is permitted by the part 22 on the rod 21 when the connection 22 is slidable, as indicated. Thereafter, a movement of the pedal 27 will be accompanied by a forward motion of the rod 21 against the tension of the spring 25, and thus will serve to lower the anti-skid disks 7 and 7' into contact with the road as long as said pedal 27 is depressed. When the driver's foot is removed from the pedal 27 the spring 25 will operate to raise the disks out of contact with the road surface, and the car may then proceed until the brakes are again applied. A small spring 43 connected with the bracket 29 serves to hold the slotted bar 31 in its normal position with reference to the pivoted pin 30 in the slot 32.

From the above description it will be appreciated that the principal object of the present invention is accomplished in a practical manner by having the inclined supports for the disks pivoted near the center of the body of the car, as on the rear axle housing so that they extend laterally toward the wheels at angles to the road surface. With such an arrangement the disks are not forced into the road surface unless the car should skid or side slip, in which case the angular mounting of the disks and the weight of the car itself provides the necessary pressure on the road surface to force the disks into positive contact therewith to prevent motion in lateral directions. Thus the force of contact of the disks with the road surface is independent of the action of the driver of the car when the disks have been lowered into position after the application of the brakes. When there is no skidding the disks are substantially inoperative and do not engage the road surface to any objectionable extent. The action of the disks is therefore practically automatic.

Having thus described this embodiment of our invention, we do not wish to be understood as being limited to the details of construction and arrangement of parts, for various changes may be made by those skilled in the art without departing from the spirit and scope of our invention as set forth in the appended claims.

What we claim and desire to protect by Letters Patent is:

1. In an anti-skid apparatus for automobiles, having disks or similar devices adapted to be raised and lowered and to engage a road surface, the improvement which comprises inclined supports pivoted at one end to a fixed part of the car structure, rotatable disks having sharp edges, carried on the outer ends of said supports at right angles thereto and means for raising and lowering said inclined supports.

2. In an anti-skid apparatus for automobiles, having disks or similar devices adapted to be raised and lowered and to engage a road surface, the improvement which comprises inclined supports pivoted at one end to a fixed part of the car structure, rotatable discs carried on the outer ends of said supports means for raising and lowering said supports, and a lever adjacent the operator's position and with which said means are adapted to be operatively connected to control the position of said disks.

3. In an anti-skid apparatus for automobiles, having disks or similar devices adapted to be raised and lowered and to engage a road surface, the improvement which comprises lateral supports carried by a fixed part of the car structure, means for raising and lowering said supports, a brake pedal connected with the brake devices of the car and normally out of engagement with said raising and lowering means, means having a handle located on the instrument board of the car for causing said brake devices to connect with the first named means and means to counterbalance the weight of said inclined supports and attached parts, to normally hold said anti-skid apparatus in inoperative position when disconnected from said brake devices.

4. In an anti-skid apparatus for automobiles, having disks adapted to be raised and lowered to operate on a road surface, the improvement which comprises, inclined lateral supports carried at one end by a fixed part of the car structure, concave disks having sharp edges rotatably mounted on the outer ends thereof, means for raising and lowering said supports and for normally holding said supports in raised position, a brake pedal connected with the brake devices of the car, a part carried by said pedal and adapted to positively engage and disengage said raising and lowering means, a bar having a detachable connecting device therein and designed to engage said last named part, and a manually slidable member to be grasped by the operator to cause said connecting device to engage said part whereby said anti-skid apparatus is operated simultaneously with said brake devices.

ROYDEN O. COUCH.
LEO B. ESCHBACH.